United States Patent
Bodik et al.

(10) Patent No.: US 9,262,216 B2
(45) Date of Patent: Feb. 16, 2016

(54) COMPUTING CLUSTER WITH LATENCY CONTROL

(75) Inventors: Peter Bodik, Kirkland, WA (US); Andrew D. Ferguson, Princeton, NJ (US); Srikanth Kandula, Redmond, WA (US); Eric Boutin, Bellevue, WA (US)

(73) Assignee: Microsoft Technologies Licensing, LLC, Redmond, WA (US)

( * ) Notice: Subject to any disclaimer, the term of this patent is extended or adjusted under 35 U.S.C. 154(b) by 376 days.

(21) Appl. No.: 13/372,717

(22) Filed: Feb. 14, 2012

(65) Prior Publication Data
US 2013/0212277 A1 Aug. 15, 2013

(51) Int. Cl.
*G06F 9/48* (2006.01)

(52) U.S. Cl.
CPC .................................. *G06F 9/4887* (2013.01)

(58) Field of Classification Search
CPC ..... G06Q 10/103; G06Q 10/06; G06Q 10/04; G06F 9/5061; G06F 9/505
USPC ........................................................ 709/226
See application file for complete search history.

(56) References Cited

U.S. PATENT DOCUMENTS

| | | | |
|---|---|---|---|
| 7,406,689 B2 | 7/2008 | Berstis et al. | |
| 7,441,244 B2 | 10/2008 | Longobardi | |
| 7,512,946 B2 | 3/2009 | MacLellan | |
| 7,739,314 B2 | 6/2010 | Datar et al. | |
| 8,140,523 B2 * | 3/2012 | Fakhouri et al. | 707/720 |
| 8,219,546 B2 * | 7/2012 | Yan | G06F 17/30445 707/716 |
| 8,260,840 B1 | 9/2012 | Sirota et al. | |
| 8,261,283 B2 | 9/2012 | Tsafrir et al. | |
| 8,631,415 B1 | 1/2014 | Nadathur et al. | |
| 2004/0131337 A1 | 7/2004 | Ono et al. | |
| 2005/0283534 A1 * | 12/2005 | Bigagli et al. | 709/229 |
| 2006/0288346 A1 * | 12/2006 | Santos | G06F 9/4887 718/102 |
| 2007/0143765 A1 | 6/2007 | Aridor et al. | |
| 2009/0055370 A1 | 2/2009 | Dagum et al. | |
| 2010/0115046 A1 | 5/2010 | Reddy Byreddy et al. | |
| 2010/0122053 A1 | 5/2010 | Prahlad et al. | |
| 2010/0153960 A1 * | 6/2010 | Youn et al. | 718/104 |
| 2010/0169489 A1 * | 7/2010 | Akiyama et al. | 709/226 |

(Continued)

OTHER PUBLICATIONS

Title: Predictive Analysis Using Critical Path and Amdahl's Law
Author: Shripad Agashe.*

(Continued)

*Primary Examiner* — Brian J Gillis
*Assistant Examiner* — Steve Lin
(74) *Attorney, Agent, or Firm* — Steve Wight; Sandy Swain; Micky Minhas

(57) ABSTRACT

A computing cluster operated according to a resource allocation policy based on a predictive model of completion time. The predictive model may be applied in a resource control loop that iteratively updates resources assigned to an executing job. At each iteration, the amount of resources allocated to the job may be updated based on of the predictive model so that the job will be scheduled to complete execution at a target completion time. The target completion time may be derived from a utility function determined for the job. The utility function, in turn, may be derived from a service level agreement with service guarantees and penalties for late completion of a job. Allocating resources in this way may maximize utility for an operator of the computing cluster while minimizing disruption to other jobs that may be concurrently executing.

20 Claims, 7 Drawing Sheets

(56) References Cited

U.S. PATENT DOCUMENTS

| | | | |
|---|---|---|---|
| 2010/0175049 A1 | 7/2010 | Ramsey et al. | |
| 2010/0179855 A1 | 7/2010 | Chen et al. | |
| 2011/0138055 A1* | 6/2011 | Daly et al. | 709/226 |
| 2012/0011511 A1* | 1/2012 | Horvitz et al. | 718/100 |
| 2012/0072199 A1* | 3/2012 | Kawahara | 703/21 |
| 2012/0167101 A1 | 6/2012 | Kandula et al. | |
| 2012/0198466 A1* | 8/2012 | Cherkasova et al. | 718/104 |
| 2012/0204180 A1 | 8/2012 | Santoli et al. | |
| 2012/0290725 A1* | 11/2012 | Podila | 709/226 |
| 2013/0179371 A1* | 7/2013 | Jain et al. | 705/400 |

OTHER PUBLICATIONS

Title: Dynamic Critical-Path Scheduling: An Effective Technique for Allocating Tastk Graphs to Multiprocessors Authors: Yu-Kwong Kwok et al., Publisher: IEEE Transactions on Parallel and Distributed Systems Edition: vol., No. 5 Date: May 1996.*

Park, et al., "Predictable Time-Sharing for DryadLINQ Cluster", In Proceedings of 7th International Conference on Autonomic Computing, 2010, 10 pages.

Park, Sang-Min, "Feedback-Controlled, Virtualized Resource Sharing for Predictable E-Science", Published on: May 2010, Available at: http://www.cs.virginia.edu/~sp2kn/paper/Dissertation.pdf.

Nassif, et al., "Job Completion Prediction in Grid using Distributed Case-based Reasoning", In Proceedings of 14th IEEE International Workshops on Enabling Technologies: Infrastructure for Collaborative Enterprise, Jun. 13-15, 2005, pp. 249-254.

Bekooij, et al., "Predictable and Composable Multiprocessor System Design: A Constructive Approach", In Proceedings of Bits&Chips Symposium on Embedded Systems and Software, 2007, 14 pages.

Barker, et al., "Empirical Evaluation of Latency-sensitive Application Performance in the Cloud", In Proceedings of the First Annual ACM SIGMM Conference on Multimedia Systems, Feb. 22-23, 2010, 12 pages.

Govind, et al., "Estimating Expected Completion Times with Probabilistic Job Routing", In Proceedings of the Winter Simulation Conference, Dec. 3-6, 2006, pp. 1804-1810.

G. M. Amdahl. Validity of the single processor approach to achieving large scale computing capabilities. In Proc. AFIPS '67(Spring). http://www.cs.utexas.edu/~dburger/cs395t/papers/5_amdahl.pd.

G, Ananthanarayanan, S. Kandula, A. Greenberg, I. Stoica, Y. Lu, B. Saha, and E. Harris. Reining in the Outliers in Map Reduce Clusters using Mantri. In Proc. OSDI 10, 2010. http://research.microsoft.com/pubs/132199/mantri_tr_2010.pdf.

E. Anderson, D. Beyer, K. Chaudhuri, T. Kelly, N. Salazar, C. Santos, R. Swaminathan, R. Tarjan, J. Wiener, and Y. Zhou. Value-maximizing deadline scheduling and its application to animation rendering. In Proc. SPAA 05. http://www.hpl.hp.com/research/ssp/papers/2005-spaa-scheduling.pdf.

D. Borthakur, J. Gray, J. S. Sarma, K. Muthukkaruppan, N. Spiegelberg, H. Kuang, K. Ranganathan, D. Molkov, A. Menon, S. Rash, R. Schmidt, and A. Aiyer. Apache Hadoop goes realtime at Facebook. SIGMOD '11. http://borthakur.com/ftp/RealtimeHadoopSigmod2011.pdf.

R. Chaiken, B. Jenkins, P. Larson, B. Ramsey, D. Shakib, S. Weaver, and J. Zhou. Scope: easy and efficient parallel processing of massive data sets. Proc. VLDB, 1(2), 2008. http://pages.cs.brandeis.edu/~olga/cs228/Reading%20List_files/scope.pdf.

J. Dean and S. Ghemawat. MapReduce: Simplified data processing on large clusters. Commun. ACM, 51, 2008. http://cacs.usc.edu/education/cs653/Dean-MapReduce-CACM08.pdf.

S. Ghemawat, H. Gobioff, and S.-T. Leung. The Google file system. SIGOPS Oper. Syst. Rev., 37(5),2003 http://static.googleusercontent.com/external_content/untrusted_dlcp/labs.google.com/en//papers/gfs-sosp2003.pdf.

H. Herodotou, F. Dong, and S. Babu. No one (cluster) size fits all: Automatic cluster sizing for data-intensive analytics. In Proc. SoCC '11. http://prophet.cs.duke.edu/~hero/files/socc11-cluster-sizing.pdf.

M. Isard, M. Budiu, Y. Yu, A. Birrell, and D. Fetterly. Dryad: distributed data-parallel programs from sequential building blocks. In Proc. EuroSys '07. http://www.cse.buffalo.edu/~stevko/courses/cse704/fall10/papers/eurosys07.pdf.

M. Isard, V. Prabhakaran, J. Currey, U. Wieder, K. Talwar, and A. Goldberg. Quincy: fair scheduling for distributed computing clusters. In Proc. SOSP '09. http://citeseerx.ist.psu.edu/viewdoc/download?doi=10.1.1.154.5498&rep=rep1&type=pdf.

A. Li, X. Yang, S. Kandula, and M. Zhang. Cloudcmp: comparing public cloud providers. In Proc. IMC'10. http://www.cs.duke.edu/~angl/papers/imc10-cloudcmp.pdf.

K. Morton, M. Balazinska, and D. Grossman. Paratimer: a progress indicator for mapreduce dags. In Proc. SIGMOD 10. http://event.cwi.nl/SIGMOD-RWE/2010/21-92473b/paper.pdf.

D. G.Murray, M. Schwarzkopf, C. Smowton, S. Smith, A.Madhavapeddy, and S. Hand. Ciel: a universal execution engine for distributed data-flow computing. In Proc. NSDI'11. http://www.cl.cam.ac.uk/~ms705/pub/papers/2011-ciel-nsdi.pdf.

C. Olston, B. Reed, U. Srivastava, R. Kumar, and A. Tomkins. Pig latin: a not-so-foreign language for data processing. In Proc. SIGMOD, 2008. http://i.stanford.edu/~olston/publications/sigmod08.pdf.

T. Sandholm and K. Lai. Mapreduce optimization using regulated dynamic prioritization. In Proc. SIGMETRICS '09. http://citeseerx.ist.psu.edu/viewdoc/download?doi=10.1.1,163.3751&rep=rep1&type=pdf.

A Thusoo, J. S. Sarma, N. Jain, Z. Shao, P. Chakka, S. Anthony, H. Liu, P. Wyckoff, and R. Murthy. Hive: a warehousing solution over a map-reduce framework. Proc. VLDB Endow., 2009. http://www.utdallas.edu/~mxk055100/courses/cloud11f_files/hive.pdf.

B. Urgaonkar, P. Shenoy, A. Chandra, and P. Goyal. Dynamic provisioning of multi-tier internet applications. In Proc. ICAC, 2005. http://ieeexplore.ieee.org/stamp/stamp.jsp?tp=&arnumber=1498066.

A. Verma, L. Cherkasova, and R. H. Campbell. SLO-Driven Right-Sizing and Resource Provisioning of MapReduce Jobs. In Proc. LADIS '11. http://verma7.com/pdfs/LADIS11_ARIA.pdf.

G. Wang and T. Ng. The impact of virtualization on network performance of Amazon EC2 data center. In Proc. INFOCOM '10. http://citeseerx.ist.psu.edu/viewdoc/download?doi=10.1.1.158.9814&rep=rep1&type=pdf.

M. Zaharia, D. Borthakur, J. Sen Sarma, K. Elmeleegy, S. Shenker, and I. Stoica. Delay scheduling: a simple technique for achieving locality and fairness in cluster scheduling. In Proc. EuroSys '10. http://www.research.yahoo.net/files/eurosys_delay_scheduling.pdf.

C. Chambers, A. Raniwala, F. Perry, S. Adams, R. R. Henry, R. Bradshaw, and N. Weizenbaum. FlumeJava: easy, efficient data-parallel pipelines. In Proc. PLDI'10.

Notice of Allowance mailed Aug. 28, 2015 from U.S. Appl. No. 12/979,338, 6 pages.

Ahmad et al., "Semi-distributed load balancing for massively parallel multicomputer systems," IEEE Transactions on Software Engineering, vol. 17, No. 10, Oct. 1991, p. 987-1004.

Ananthanarayanan, et al., "Reigning in the outliers in map-reduce clusters using Mantri," Techical Report MSR-TR-210-69, Microsoft Research, 2010, 24 pages.

Graham, R.L., "Bounds on multiprocessing time anomalies," SIAM Journal on Applied Mathematics, vol. 17, No. 2, 1969 14 pages.

Kandula, et al., "Walking the Tightrope: Responsive Yet Stable Traffic Engineering," SIGCOMM'05, Aug. 21-26, 2005, 12 pages.

Manoharan, S., "Effect of task duplication on assignment of dependency graphs," Parallel Computing 27 (2001), pp. 257-268.

Kwon, et al., "Skew-Resitant Parallel Processing of Feature-Extracting Scientific User-Defined Functions," SoCC'10, Jun. 10-11, 2010, 12 pages.

"Notice of Allowance," Mailed May 8, 2015, From U.S. Appl. No. 12/979,338, 5 pages.

"Non-Final Office Action," Mailed Feb. 1, 2013, From U.S. Appl. No. 12/979,338, 14 pages.

"Response to Non-Final Office Action Dated Feb. 1, 2013," Filed May 30, 2013, From U.S. Appl. No. 12/979,338, 18 pages.

(56) References Cited

OTHER PUBLICATIONS

"Final Office Action," Mailed Jul. 15, 2013, From U.S. Appl. No. 12/979,338, 20 pages.
"Response to Final Office Action Dated Jul. 15, 2013," Filed Oct. 25, 2013, From U.S. Appl. No. 12/979,338, 16 pages.
"Non-Final Office Action," Mailed Jun. 19, 2014, From U.S. Appl. No. 12/979,338, 19 pages.
"Response to Non-Final Office Action Dated Jun. 19, 2014," Filed Sep. 17, 2014, From U.S. Appl. No. 12/979,338, 22 pages.
"Notice of Allowance," Mailed Dec. 31, 2014, From U.S. Appl. No. 12/979,338, 16 pages.
Ferguson et al., "Jockey: Guaranteed Job Latency in Data Parallel Clusters," EuroSys'12, Apr. 10-13, 2012, Bern Switzerland, 14 pages.
Ananthanarayanan et al., "Scarlett: Coping with Skewed Content Popularity in MapReduce Clusters," In Proc. EuroSys'11, Salzburg, Austria, 2011, 14 pages.
Ravindran et al., "Adaptive resource management in asynchronous real-time distributed systems using feedback control functions," In Proc. of 5th Symposium on Autonomous Decentralized Systems, Jan. 2001, pp. 39-46.
Sandholm et al., "Prediction-based enforcement of performance contracts," In Proc. GECON '07, Rennes, France, 2007, 13 pages.
Sandholm et al., "A statistical approach to risk mitigation in computational markets," In Proc. HPDC '07, Monterey, CA, USA, 2007, 11 pages.
Xuan, Utilization-Based Admission Control for Real-Time Applications, In Proc. ICPP '10, Washington, DC, USA, 2000, 10 pages.
Koufakou et al., "Fast Parallel Outlier Detection for Categorical Datasets using MapReduce", Retrieved at << http://ml.cecs.ucf.edu/dspace/bitstream/123456789/247/1/NN0897.pdf >>, IEEE International Joint Conference on Neural Networks, IJCNN, (IEEE World Congress on Computational Intelligence), Jun. 1-8, 2008, pp. 3297-3303.
Polo et al., "Performance-Driven Task Co-Scheduling for MapReduce Environments", Retrieved at << http://people.ac.upc.edu/dcarrera/papers/NOMS2010.pdf >>, 12th IEEE/IFIP Network Operations and Management Symposium (NOMS'10), Apr. 19-23, 2010, 7 pages.
Tan, Jiaqi., "Log-based Approaches to Characterizing and Diagnosing MapReduce Systems", Retrieved at << http://reports-archive.adm.cs.cmu.edu/anon/home/ftp/2009/CMU-CS-09-143.pdf >>, CMU-CS-09-143, Jul. 2009, 113 pages.
Kavulya et al., "An Analysis of Traces from a Production MapReduce Cluster", Retrieved at <<http://www.pdl.cmu.edu/PDL-FTP/stray/CMU-PDL-09-107.pdf >>, CMU-PDL-09-107, Dec. 2009, 18 pages.
"Hadoop distributed filesystem", Retrieved at << http://hadoop.apache.org >>, Retrieved Date: Jul. 27, 2010, 2 pages.
Faraj et al., "STAR-MPI: Self Tuned Adaptive Routines for MPI Collective Operations", Retrieved at << http://www.cs.arizona.edu/~dkl/research/papers/ics06.pdf >>, International Conference on Supercomputing, Proceedings of the 20th annual international conference on Supercomputing, Jun. 28-Jul. 1, 2006, 10 pages.
Greenberg et al., "VL2: A Scalable and Flexible Data Center Network", Retrieved at << http://gk12net.uml.edu/blog/research/files/2010/02/VL2_A_Scalable_and_Flexible_Data_Center_Network.pdf >>, Applications, Technologies, Architectures, and Protocols for Computer Communication, Proceedings of the ACM SIGCOMM 2009 conference on Data communication, Aug. 16-21, 2009, 12 pages.
Andersen et al., "Improving web availability for clients with monet", Retrieved at << http://repository.cmu.edu/cgi/viewcontent.cgi?article=1075&context=compsci >>, Proceedings of the 2nd conference on Symposium on Networked Systems Design & Implementation, vol. 2, May 2-4, 2005, 15 pages.
Ucar et al., "Task assignment in heterogeneous computing systems", Retrieved at << http://graal.ens-lyon.fr/~bucar/papers/UcarAykanatKayalkinciJPDCv66n1.pdf >>, Journal of Parallel and Distributed Computing, vol. 66, No. 1, Jan. 2006, pp. 32-46.

Bairavasundaram et al., "An analysis of data corruption in the storage stack", Retrieved at << http://www.cs.utoronto.ca/~bianca/papers/fast08.pdf , Proceedings of the 6th USENIX Conference on File and Storage Technologies, Feb. 26-29, 2008, 16 pages.
Chaiken et al., "Scope: Easy and Efficient Parallel Processing of Massive Datasets", Retrieved at << http://www.cs.washington.edu/education/courses/cse444/08au/544M/READING-LIST/Scope-2008.pdf>>, VLDB Endowment, Aug. 24-30, 2008, pp. 1-12.
Condie et al., "Mapreduce online", Retrieved at << http://www.usenix.org/event/nsdi10/tech/full_papers/condie.pdf >>, Nsdi Conference on Networked Systems Design and Implementation, Proceedings of the 7th USENIX conference on Networked systems design and implementation, Apr. 28-30, 2010, 15 pages.
Culler et al., "LogP: Towards a Realistic Model of Parallel Computation", Retrieved at << http://parasol.tamu.edu/people/amato/Courses/626/references/logP.pdf >>, ACM SIGPLAN Notices, vol. 28, No. 7, Jul. 1993, pp. 1-24.
Dean et al., "Simplified data processing on large clusters", Retrieved at << http://www.eecs.umich.edu/~klefevre/eecs584/Handouts/mapreduce.pdf >>, Communications of the ACM, 50th anniversary, vol. 51, No. 1, Jan. 2008, pp. 1-27.
Isard et al., "Dryad: Distributed Data-parallel Programs from Sequential Building Blocks", Retrieved at << http://pdos.csail.mit.edu/6.824-2007/papers/isard-dryad.pdf >>, European Conference on Computer Systems, Proceedings of the 2nd ACM SIGOPS/EuroSys European Conference on Computer Systems, Mar. 21-23, 2007, 14 pages.
Isard et al., "Quincy: Fair scheduling for distributed computing clusters", Retrieved at << http://www.sigops.org/sosp/sosp09/papers/isard-sosp09.pdf >>, ACM Symposium on Operating Systems Principles, Proceedings of the ACM SIGOPS 22nd symposium on Operating systems principles, Oct. 11-14, 2009, pp. 1-20.
Kandula et al., "The Nature of Datacenter Traffic: Measurements and Analysis", Retrieved at << http://research.microsoft.com/en-us/UM/people/srikanth/data/imc09_dcTraffic.pdf >>, IMC, Nov. 4-6, 2009, 7 pages.
Ko et al., "On Availability of Intermediate Data in Cloud Computations", Retrieved at << http://dprg.cs.uiuc.edu/docs/iss/hotos09.pdf >>, Proceedings of the 12th conference on Hot topics in operating systems, May 18-20, 2009, pp. 1-5.
Ko et al., "Making cloud intermediate data fault-tolerant", Retrieved at << http://kepler.cs.uiuc.edu/docs/iss-socc/socc077-ko.pdf >>, International Conference on Management of Data, Proceedings of the 1st ACM symposium on Cloud computing, Jun. 10-11, 2010, 12 pages.
Krishnamurthy et al., "Analyses and optimizations for shared address space programs", Retrieved at << http://reference.kfupm.edu.sa/content/a/n/analyses_and_optimizations_for_shared_ad_126433.pdf >>, vol. 38, No. 2, 1996, 20 pages.
Al-Fares et al., "A Scalable, Commodity Data Center Network Architecture", Retrieved at << http://www.cs.ucsb.edu/~ravenben/classes/276/papers/alv.pdf >>, SIGCOMM'08, Aug. 17-22, 2008, pp. 63-74.
Chien et al., "MPI-FM: High Performance MPI on Workstation Clusters", Retrieved at << http://reference.kfupm.edu.sa/content/m/p/mpi_fm_high_performance_mpi_on_workstat_123888.pdf >>, 1997 27 pages.
Zaharia et al., "Improving MapReduce Performance in Heterogeneous Environments", Retrieved at << http://www.cs.berkeley.edu/~mate/papers/2008/osdi_late.pdf>>, Proceedings of the 8th USENIX conference on Operating systems design and implementation, Dec. 8-10, 2008, pp. 29-42.
Olston et al., "Pig Latin: A Not-So-Foreign Language for Data Processing", Retrieved at << http://research.yahoo.net/files/sigmod08.pdf>>, International Conference on Management of Data, Proceedings of the 2008 ACM SIGMOD international conference on Management of data, Jun. 9-12, 2008, 12 pages.
Patarasuk et al., "Pipelined Broadcast on Ethernet Switched Clusters", Retrieved at << http://citeseerx.ist.psu.edu/viewdoc/download?doi=10.1.1.72.4747&rep=rep1&type=pdf >>, 20th International Parallel and Distributed Processing Symposium, IPDPS, Apr. 25-29, 2006, 10 pages.
Pavlo et al., "A comparison of approaches to large scale data analysis", Retrieved at << http://www.cs.brandeis.edu/~olga/cs228/

(56) References Cited

OTHER PUBLICATIONS

Reading%20List_files/benchmarks-sigmod09.pdf >>, International Conference on Management of Data, Proceedings of the 35th SIGMOD international conference on Management of data, Jun. 29-Jul. 2, 2009, 14 pages.

Rhea et al., "Fixing the embarrassing slowness of opendht on planetlab", Retrieved at << http://cs.ucla.edu/~kohler/class/08w-dsi/rhea05fixing.pdf>>, Proceedings of the 2nd conference on Real, Large Distributed Systems, vol. 2, 2005, pp. 1-6.

Roy et al., "Airavat: Security and privacy for mapreduce", Retrieved at << http://citeseerx.ist.psu.edu.edu/viewdoc/download?doi=10.1.1.161.3964&rep1&type=pdf>>, 2009, pp. 1-15.

Sandholm et al., "Mapreduce optimization using regulated dynamic prioritization", Retrieved at << http://www.hpl.hp.com/personal/Thomas_Sandholm/sandholm2009a.pdf >>, Joint International Conference on Measurement and Modeling of Computer Systems, Proceedings of the eleventh international joint conference on Measurement and modeling of computer systems, Jun. 15-19, 2009, 12 pages.

Sekar et al., "Csamp: A system for network-wide flow monitoring", Retrieved at << http://www-2.cs.cmu.edu/~dga/papers/csamp-nsdi2008.pdf >>, In the Proceedings of Fifth USENIX Symposium on Networked Systems Design and Implementation, (NSDI), Apr. 2008, 14 pages.

Wischik et al., "The resource pooling principle", Retrieved at << http://www.cs.ucl.ac.uk/staff/D.Wischik/Research/respool.pdf >>, ACM SIGCOMM Computer Communication Review, vol. 38, No. 5, Oct. 2008, 6 pages.

Yu et al., "Distributed Aggregation for Data-Parallel Computing: Interfaces and Implementations", Retrieved at << http://www.sigops.org/sosp/sosp09/papers/yu-sosp09.pdf >>, ACM Symposium on Operating Systems Principles, Proceedings of the ACM SIGOPS 22nd symposium on Operating systems principles, Oct. 11-14, 2009, pp. 1-17.

Yu et al., "DryadLINQ: A System for General-Purpose Distributed Data-Parallel Computing Using a High Level Language", Retrieved at << http://www.usenix.org/events/osdi08/tech/full_papers/yu_y/yu_y_html/ >>, In Proceedings of the 8th Symposium on Operating Systems Design and Implementation, (OSDI), Dec. 8-10, 2008, 11 pages.

Zaharia et al., "Job scheduling for multi-user mapreduce clusters", Retrieved at << http://www.eecs.berkeley.edu/Pubs/TechRpts/2009/EECS-2009-55.pdf>>, Technical Report, No. UCB/EECS-2009-55, Apr. 30, 2009, 18 pages.

Lumezanu et al., "Online optimization for latency assignment in distributed real-time systems," In Proc. ICDCS '08, Jun. 2008, 8 pages.

\* cited by examiner

COMPUTING CLUSTER WITH LATENCY CONTROL

BACKGROUND

Computing clusters are used to perform large processing jobs. The clusters contain multiple processing resources, which could be physical processors or virtual processors. A cluster also includes a scheduler that allocates the processing resources to jobs submitted to the cluster. The policy under which a scheduler operates impacts overall performance of the computing cluster.

Jobs may contain multiple computational tasks that can be assigned for execution to multiple computing resources. For most large jobs that are "data-parallel jobs," some tasks can be executed in parallel, while others are dependent on data generated from other tasks. As a result, some tasks cannot be executed until execution of other tasks is completed. For data-parallel jobs, allocating multiple processing resources to a job may allow more tasks to be executed in parallel, thereby improving execution time of the job. However, for each job, execution time may not improve linearly in relation to the number of processing resources allocated to the job. Despite the fact that there may be many tasks left to execute, at any given time, there is a limit on the number of tasks that are ready to execute.

Moreover, in a computing cluster, multiple jobs may be pending for execution at one time. Allocating too many of the processing resources of the cluster to a single job may impact the performance of other jobs. Accordingly, a scheduler of a cluster may operate according to a policy that seeks to distribute processing resources in a reasonable fashion across jobs. As an example of a policy, some minimum amount of processing resources may be allocated to each job ready for execution. Any remaining resources may then be allocated to jobs as they have tasks ready to execute.

Allocating processing resources to jobs can be particularly challenging for an operator of a computing cluster when, through service level agreements with customers who have agreed to buy computing services from the cluster operator, the operator has committed to complete execution of certain jobs within a specified amount of time. Such a commitment may be regarded as a service "guarantee," and the service level agreement may entail a significant financial penalty if the job is not completed in accordance with the guarantee.

A service guarantee may create a high priority job for an operator of a computing cluster. Scheduling policies that account for high priority jobs are known. In some scenarios, manual intervention is employed. As the job executes, the operator tracks progress. When the progress appears to be too slow to finish in time, more resources are added to the job. In other policies, the scheduler is simply controlled to allocate to such a job a large amount of resources. In some approaches, a separate compute cluster, containing enough processing resources to complete the high priority job by the guaranteed time, is dedicated to the job. Other policies preferentially allocate processing resources to the high priority job. Another approach is to model execution of the job to determine an amount of processing resources that seems likely to result in execution of the job prior to the guarantee time, and this level of resources may be allocated to the job from the outset.

SUMMARY

Improved operation of a computing cluster is provided with a resource allocation policy that builds a model of performance that relates time remaining to complete a job to resources allocated to the job. The model may further reflect the progress of the job such that, at different times during execution of the job, the model can be applied based on the progress of the job to that time.

The model may be built to reflect dependencies between tasks. Such a model may be based on a directed graph. Moreover, the model may be constructed to account for failures in execution of some tasks during execution of the job. Accounting for dependencies and/or failures in the model may provide for more robust control over the resources when resources are allocated based on the model.

With such a model, the amount of resources allocated to a job may be adjusted throughout execution of the job so that a target completion time is met. The target completion time may be determined by application of a utility function indicating a metric of utility in relation to completion time. The utility function may be based on a service level agreement to reflect payments to or penalties on an operator of a computing platform, depending on the time at which the job completes. Alternatively or additionally, the target time may be based on a requested completion time submitted with the job or derived from a required time for output for the job to be available.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
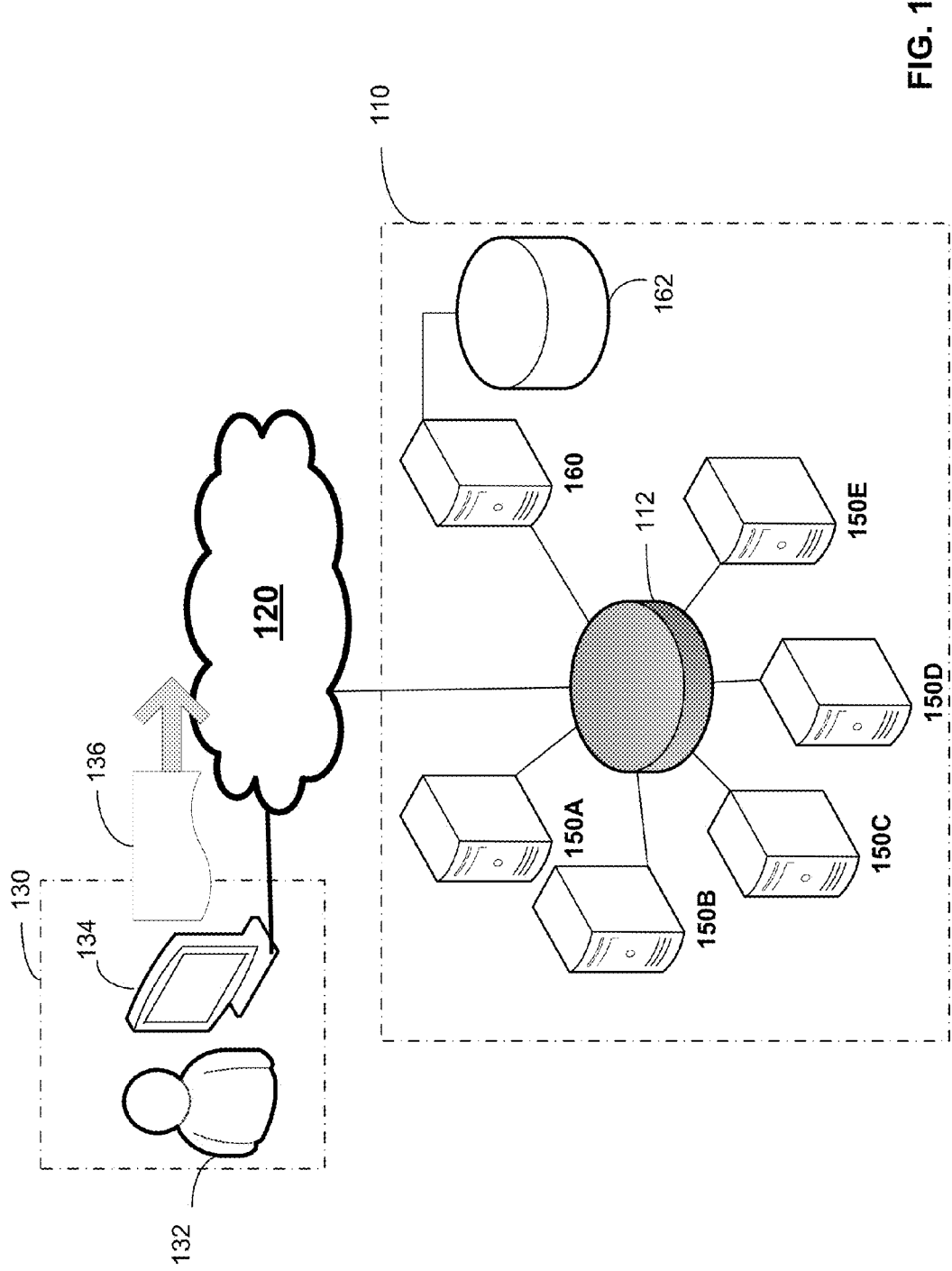
FIG. 1 is a sketch of computing cluster operating in accordance with an exemplary embodiment of a scheduling policy using a predictive model.

The inventors have recognized and appreciated benefits in operating a cluster computing platform that may be achieved by a scheduling policy that adaptively sets resource levels based on a robust predictive model of time to complete. The model may be used at job initiation. Alternatively or additionally, the model may thereafter be applied from time to time during execution of the job to align the amount of resources allocated to the job with an amount that, in accordance with the model, will lead to completion at or slightly before a target completion time. Such a policy may improve the efficiency of resource utilization by avoiding over-provisioning while ensuring that high priority jobs that have deadlines will be completed in accordance with those deadlines.

The target time for completion of the job at initiation, and at each time thereafter when resources are adjusted, may be determined in any suitable way. In some embodiments, the target time for completion may be determined in accordance with a utility function that is applicable to the specific job. The utility function, for example may relate a metric of utility to a completion time. The metric of utility, for example, may be financial return, including possibly a penalty for late completion, to the operator of the computing cluster. In scenarios in which the computing cluster is operated by a different entity than an entity submitting the job, the utility function may be derived from a service level agreement between those entities. A service level agreement, for example, may specify a maximum execution time for a specific job. In connection with defining an execution time, the service level agreement may specify payments to the operator of the computing cluster if the job executes in less than the maximum permitted time or may specify penalties on the operator if execution of the job takes longer than the maximum specified time.

Though, in other embodiments, other approaches for determining a target completion time may be used. For example, the target completion time may be specified as a requested completion time by the entity submitting the job. The target completion time alternatively or additionally may be determined, for example, based on some deadline associated with the job for use of output from the job.

Based on the predictive model of time to complete, a job that is running behind schedule may be allocated more resources. Resources may be removed from a job that is ahead of schedule. Because removing resources from a job that is ahead of schedule may lead to more efficient control of the computing cluster, jobs may be scheduled with "slack" such that a resource adjustment for an executing job is more likely to entail removing resources than allocating more resources.

The predictive model may be built at any suitable time and in any suitable way. In some embodiments, the predictive model may be constructed prior to execution of the job. In other embodiments, the predictive model may be constructed or updated in real time as a job executes. Suitable techniques for constructing a predictive model may include simulating execution of the job or application of Amdahl's law.

In some embodiments, construction of the model may be based on dependencies between tasks making up a job. Such dependencies may be represented as a directed graph, which may be constructed by analyzing the structure of the job submitted for execution. Alternatively or additionally, the model may reflect an assessment of failure of execution of one or more tasks making up the job.

Data about execution of tasks making up the job may be obtained in any suitable way. In some embodiments, execution statistics may be obtained by analyzing results of prior execution. Though, simulation or other suitable techniques may be used to obtain execution statistics.

Regardless of the manner in which a predictive model for execution of a job is constructed, the model may be applied to manage a computing cluster. FIG. 1 illustrates an example of an environment in which a predictive model may be applied.

FIG. 1 shows a computing cluster 110. Computing cluster 110 may contain multiple resources that may be allocated to one or more jobs. In the example of FIG. 1, resources are illustrated as computing resources, which may be provided by multiple processing nodes 150A, 150B . . . 150E. In this example, each of the processing nodes is illustrated as a physical computing device. However, it is not a requirement that there be a one to one relationship between resources and physical devices. In some embodiments, a single physical processor may be operated to provide multiple computing resources. Moreover, a single physical device may contain multiple processors, each of which may be one or more resources.

Further, it should be recognized that, though computer processing is used as an example of a resource to be allocated, different or additional types of resources may be allocated to a job executed on a computing cluster. In some scenarios, for example, memory or I/O resources may be allocated to a job executed by a computing cluster. Accordingly, it should be appreciated that the nature and implementation of the resources allocated to a job are not critical to the invention.

In the example of FIG. 1, the processing nodes 150A, 150B . . . 150E are interconnected through a network 112. A further computing device, acting as scheduler 160, is also connected to network 112. In operation, scheduler 160 may control execution of a job submitted to computing cluster 110. That control may include allocation of one or more of the processing nodes for execution of the job.

Jobs may be submitted to computing cluster 110 from any suitable source. In the example of FIG. 1, a job 136 may be submitted to computing cluster 110 from on enterprise 130. In this example, a user 132 is shown operating a client computing device 134 to submit job 136 to computing cluster 110. It should be appreciated, though, that FIG. 1 provides a simple illustration of one technique for submitting jobs to a computing cluster. In some embodiments, jobs may be automatically submitted.

The nature of the job submitted is not critical to the invention. However, in some exemplary embodiments, the jobs may be large data parallel jobs. As one example of such a job, a job may analyze data collected at a website and generate multiple statistics. These statistics may be applied to set financial terms for advertisers on the website. Not only may such a job be large, requiring extensive computational resources, it may also have a deadline driven by the need to have the statistics available for advertisers to make choices about advertising on the website.

The location from which a job is submitted is not critical to the invention. However, in this example, enterprise 130 is shown connected to computing cluster 110 through a network 120, which may be the Internet. Accordingly, jobs may be submitted to computing cluster 110 from remote locations. In the example of FIG. 1, enterprise 130 may be a separate enterprise than the operator of computing cluster 110. The specific mechanism by which jobs are submitted by a customer is not critical to the invention, and jobs may be submitted directly or indirectly by a customer. As an example of indirect submission, an operator or machine associated with the cluster computing platform may initiate execution of a job on behalf of an external customer. Even with such an indirect submission, the job may be submitted in accordance with a service level agreement with the customer or other parameters defining a target completion time.

In such a scenario, enterprise 130 may have a contractual arrangement with the operator of computing cluster 110. The contractual arrangement may be a service level agreement, specifying characteristics of the jobs that enterprise 130 may submit for execution on computing cluster 110. The service level agreement may also specify performance of computing cluster 110 in executing the submitted jobs. As a specific example, a service level agreement may specify a guarantee on the execution time of a job. In accordance with such a guarantee, the operator of computing cluster 110 commits to allocate resources for the job to meet the guaranteed execution time. In the example of a job to compute statistics relating to access to a website that are time critical, the job may be submitted in accordance with a service level agreement with a guaranteed execution time selected to ensure that the results of execution of the job will be available when they are needed.

Though, it is not a requirement of the invention that a target completion time for execution of a job be specified through a service level agreement. The target completion time, for example, may be determined based on a requested completion time made in connection with submitting the job. Alternatively or additionally, requirements may be determined or inferred in other ways, including based on a time at which results of execution of a job are required for other functions. Moreover, in scenarios in which computing cluster 110 is operated by entity 130 that submits the job, no separate service level agreement may exist. Nonetheless, completion of the job by a target completion time may be important.

Accordingly, scheduler 160 may operate to assign resources to jobs submitted for execution such that high priority jobs are executed by a target completion time. Scheduler 160 may monitor status of the execution of the job, as well as the status of other jobs being executed on computing cluster 110. Scheduler 160 may change the allocation of resources to the jobs in accordance with a policy.

Scheduler 160 may obtain information used to allocate resources to executing jobs in order to meet one or more target execution times from any suitable source. In the example illustrated in FIG. 1, scheduler 160 may obtain information used in applying its scheduling policy by accessing information in database 162. Database 162 may contain profiles for each executing job and for jobs waiting to execute. These profiles may indicate, among other things, a target completion time for the job jobs. The target completion time, for example, may be specified based on a service level agreement or obtained in any other suitable way. Database 162 also may contain a predictive model of execution of each high priority job or in some embodiments, information from which such a predictive model can be generated.

Figure 2:
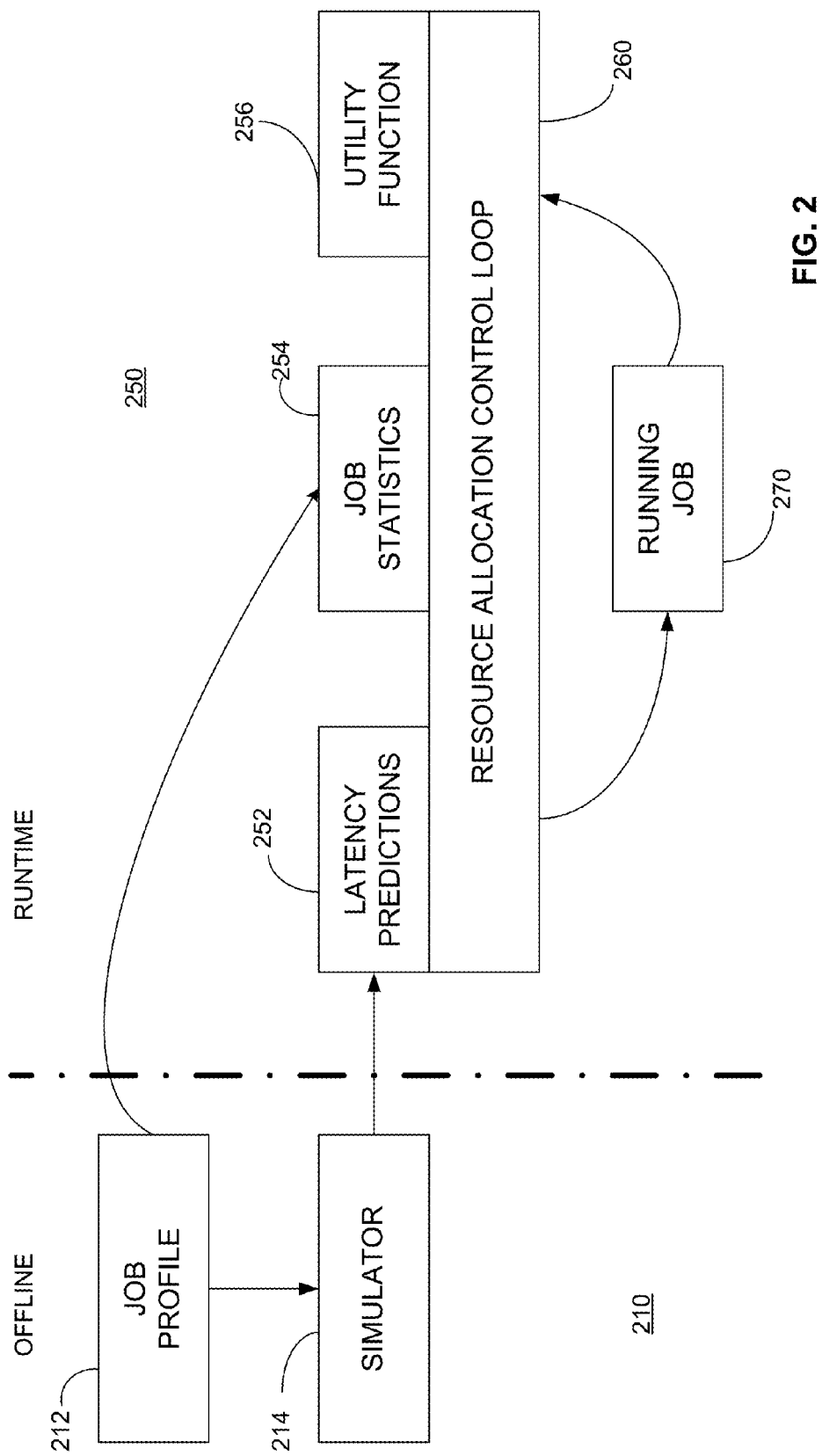
FIG. 2 is a functional block diagram illustrating a job executing on the computing cluster of FIG. 1.

The components used to submit and execute jobs in computing cluster 110 may be constructed using techniques as are known in the art. However, scheduler 160 may be adapted with a robust scheduling mechanism. FIG. 2 illustrates, as a functional block diagram, elements of the operation of scheduler 160 in accordance with some embodiments of the invention.

FIG. 2 illustrates an off-line environment 210 and a runtime environment 250. In off-line environment 210, a predictive model is generated for use in the runtime environment 250. In runtime environment 250, resource allocation control loop 260 uses the predictive model to adjust resource allocations for the running job 270. Use of the predictive model may allow running job 270 to complete execution by a target execution time.

In this example, the predictive model for the job is generated using simulator 214. Simulator 214 may be constructed using simulation techniques that are known in the art and may operate based on job profile 212. Job profile 212 may define, among other characteristics of the job, tasks that make up the job and dependencies among the tasks. Simulator 214 may use this information, and in some embodiments other information, to generate a model that relates time to complete the job to resources allocated to the job. The model may include such a relationship for each of multiple times during execution of the job. Times during execution of a job may be specified in any suitable way. The times, for example, may indicate progress in executing the job, and may be specified as a percentage of processing completed or percentage of processing remaining.

Resource allocation control loop 260 may use such a model to determine at multiple points in time during execution of the job what resources to allocate to the job in order for the job to complete execution by a target completion time. Resource allocation control loop 260 may determine the target completion time in any suitable way. In the example illustrated in FIG. 2, the target completion time may be determined by application of a utility function 256. Utility function 256 may define some metric of utility for the operator of the computing cluster as a function of completion time of the job.

In order to apply the model and/or utility function 256, resource allocation control loop 260 may monitor the progress of running job 270. The progress of running job 270 may be captured as job statistics 254. Job statistics 254 may indicate, among other parameters of running job 270, a percentage of processing on running job 270 that has been completed. The percentage of processing completed may, in turn, be based on the characteristics of the specific job executing, which may be identified from information in job profile 212.

FIG. 2 illustrates in a functional manner components of a scheduler for a computing cluster. Some or all of the functions illustrated in FIG. 2 may be performed, for example, in scheduler 160 (FIG. 1). Though, it should be appreciated that the specific hardware components in which the functions of FIG. 2 are executed is not critical to the invention. For example, off-line environment 210 may be created in any suitable computing device, even if not physically a part of the computing cluster 110 (FIG. 1). In that scenario, the model, for example, could be supplied along with the job when submitted to the computing cluster. Moreover, there is no requirement that components of runtime environment 250 be executed on the same physical device. For example, progress of an executing job may be supplied to a scheduler from one or more of the computing nodes on which the job is executing. Accordingly, it should be appreciated that the functions illustrated in FIG. 2 may be performed on any one or more suitable computing devices.

Figure 3:
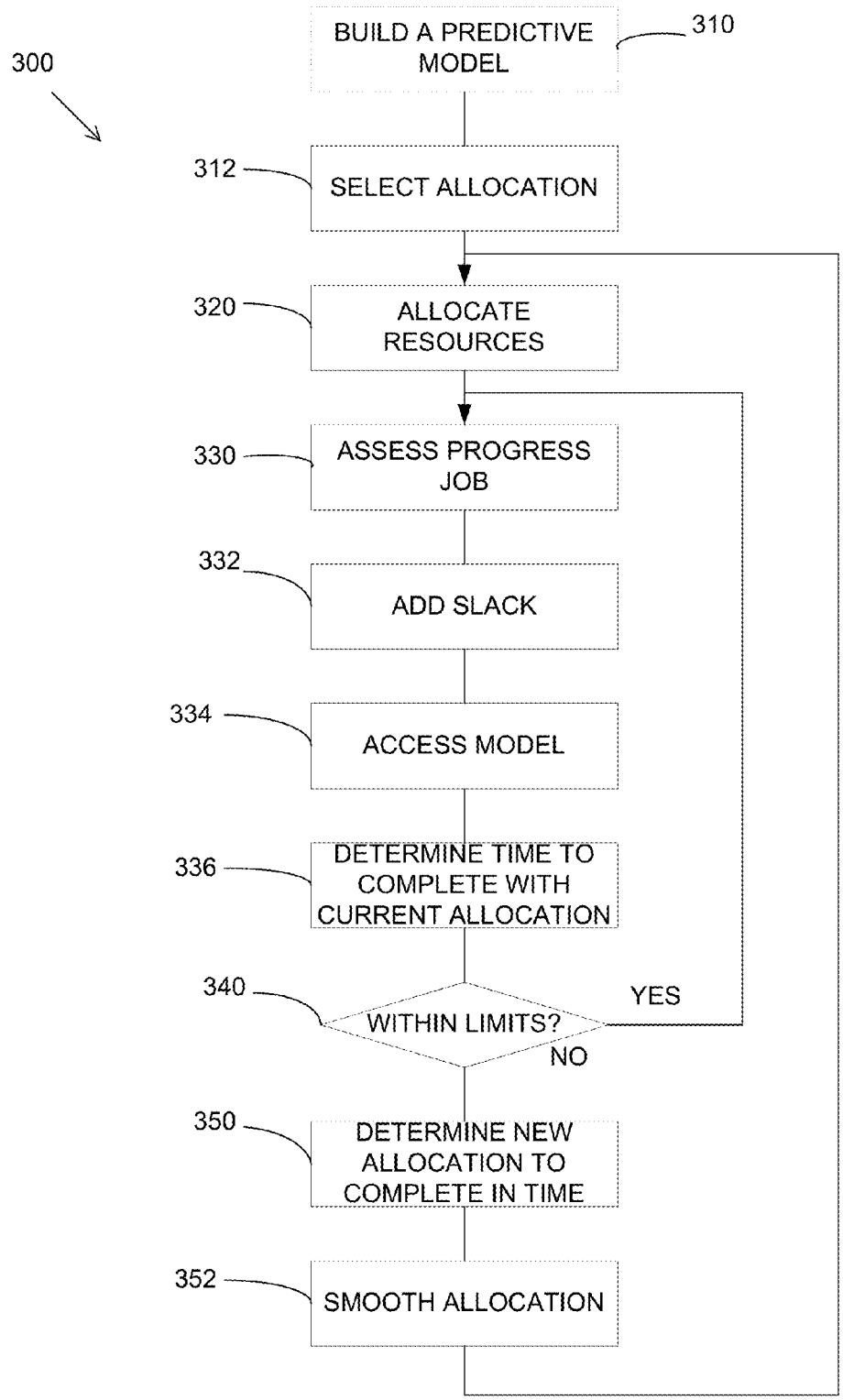
FIG. 3 is a flowchart of an exemplary embodiment of a method of operating a computing cluster using a predictive model.

FIG. 3 illustrates a method 300 of operation of a scheduler for a computing cluster. As with the functional components illustrated in FIG. 2, method 300 may be implemented within a scheduler for a computing cluster. Alternatively or additionally, some or all of the facts illustrated in FIG. 3 may be performed in any one or more other devices.

Regardless of the specific devices executing the acts illustrated in FIG. 3, method 300 may begin at act 310. In this example, act 310 is shown being performed prior to other processing on a job. This representation corresponds to an embodiment in which a predictive model for execution of a job is formed in an off-line environment. However, it should be appreciated that the order in which acts 310, or any other act in method 300, is performed is not critical to the invention. As one possible variation, act 310, involving building a predictive model of execution of a job, may occur in real time as the job is being executed.

Any suitable technique may be used to construct a predictive model. In the example described herein, the protective model may be described as a distribution of C(p,a), indicating the remaining time to complete the job when the job has made progress p and is allocated resources in an amount a.

In some embodiments, the model may be built using a simulation technique. In other embodiments, the model may be constructed using Amdahl's law. Amdahl's law is described, for example, in G. M. Amdahl, Validity of the single processor approach to achieving large scale computing capabilities. Proc. AFIPS '67 (Spring), pages 483-485, New York, N.Y., USA, 1967. ACM, which is hereby incorporated by reference in its entirety.

In some embodiments, a modified version of Amdahl's law may be used to estimate the completion time of the job given a particular allocation of resources to the job. Amdahl's Law states that if the serial part of a program takes time S to execute on a single processor, and the parallel part takes time P, then running the program with N processors takes S+P/N time. To construct a predictive model, S may be determined based on the length of the critical path of the job and P may be determined based on the aggregate CPU time spent executing the job, minus the time on the critical path. To estimate the remaining completion time of a job when allocated a level of resources, a, the above formula may be evaluated with N=a.

To use Amdahl's Law as part of a resource allocation loop, an estimate may be made of the total work remaining in the job, $P_t$, and the length of the remaining critical path, $S_t$, while the job is running. For each stage s of the job, let $f_s$ be the fraction of tasks that finished in stage s, $l_s$ be the execution time of the longest task in stage s, $L_s$ be the longest path from stage s to the end of the job and $T_s$ be the total CPU time to execute all tasks in stage s. In some embodiments, the last three parameters may be estimated from prior runs before the job starts, and $f_s$ may be maintained by a job manager at run time. Based on values for these parameters, $S_t$ may be computed as the maximum over all stages for which the fraction of tasks completed is less than one of the quantity $(1-f_s)l_s+L_s$. A value for $P_t$ may be computed as the sum over all stages for which the fraction of tasks completed is less than 1 of the quantity $(1-f_s)T_s$. In other words, across stages with unfinished tasks $f_s<1$, the total CPU time that remains is estimated to be $P_t$ and the longest critical path starting from any of those stages to be $S_t$.

In the embodiments in which a simulation is used to construct a predictive model, any suitable simulation techniques may be used. In some embodiments, a job simulator produces an estimate of the job completion time given a particular allocation of resources and job progress. These estimates may be based on one or more previous runs of the job, from which are extracted performance statistics such as the per-stage distributions of task runtimes and initialization latencies, and the probabilities of single and multiple task failures. The job simulator takes as input these statistics, along with the job's algebra (list of stages, tasks and their dependencies), and simulates events in the execution of the job. Any suitable events may be simulated, including events such as allocating tasks to machines, restarting failed tasks and scheduling tasks as their inputs become available. A simulator may capture one or more features of the job's performance, such as outliers (tasks with unusually high latency) and barriers (stages which start only when all tasks in dependent stages have finished), but it is not a requirement that the simulator simulate all aspects of the system. For example, in some embodiments input size variation and the scheduling of duplicate tasks are not simulated, though in other embodiments they may be.

In the embodiments in which the simulator is run in real time, the simulator may be invoked by the resource allocation control loop (260, FIG. 2). A basic implementation of the resource allocation control loop may invoke the simulator during each iteration by marking the completed tasks and simulating forward. Then, for each resource allocation under consideration, multiple simulations could be used to estimate the distribution of completion times and thus the expected utility given that allocation. In such an embodiment in which the simulator is run in real time, the latency prediction 252 may be refined using the profile 212 that is being generated as the job is running. Though, as noted above, in the embodiment pictured in FIG. 3, the simulator is used off-line to pre-compute information used to accurately and quickly allocate resources.

The simulator may be used to estimate the distribution of C(p, a) by simulating the job at different resource allocations. From each simulation, say at allocation a that finishes in time T, a value can be computed for all discrete times t between zero and T the progress of the job $p_t$ at time t and the remaining time to completion $t_c=T-t$. The time to complete $t_c=C(p_t, a)$, (i.e., the value $t_c$) is one sample from the distribution of $C(p_t, a)$. Iterating over all t in a run and simulating the job many times with different values of a provides many more samples, from which the distribution may be estimated.

Regardless of whether a predictive model is built prior to execution of the job or how it is built, method 300 may proceed to act 312. Act 312 represents the beginning of acts performed in the runtime environment. In this example, act 312 involves selecting a resource allocation for the job to be executed. In embodiments in which the predictive model is constructed prior to execution of the job, processing and act 312 may entail accessing the model. By accessing the portion of the model that indicates completion times for the job, with 0% of the job completed, for each of multiple resource allocations, a resource allocation that will lead to completion prior to a target completion time can be identified from the predictive model.

Processing may then proceed to act 320. At act 320, resources, based on the amount selected at act 312, maybe allocated for execution of the job. In some embodiments, the amount of resources allocated may exactly match the amount of resources selected in act 312. However, in other embodiments, processing on the job may be slightly "frontloaded" such that it is more likely that any future adjustments will entail removing resources allocated to the job rather than adding resources. As a specific example, the resources allocated as part of act 320 may be 120% of the amount of resources identified in act 312.

Regardless of the number of resources allocated, with allocated resources, the job may begin to execute. At some time after execution, which may be determined by programming of the scheduler or in any other suitable way, progress of the job may be assessed at act 330. In some embodiments, progress may be assessed by computing a value of a progress indicator. Though, there is no requirement that the indicator be a single value. The model may also use a multi-dimensional progress indicator, as there is no requirement that the progress indicator be a single number/single dimension.

As one example, a job progress indicator can integrate several characteristics of a running job. Examples include the fraction of completed tasks in each stage, the aggregate CPU time spent executing, the relative time when a particular stage is started or completed, and the length of the remaining critical path. These characteristics may be integrated in any suitable way. In some embodiments, they may be integrated into a totalworkWithQ progress indicator. Such an indicator estimates job progress to be the total time that completed tasks spent enqueued or executing. Such an indicator may be based on a representation of a job as multiple successive stages. One or more tasks may be executed in each stage, with the tasks executed in a stage depending on completion of a task in a prior stage.

Based on past run(s) of the job, for each stage s, the total time tasks spend executing $T_s$ and enqueued $Q_s$ can be computed. At runtime, given $f_s$, the fraction of tasks in stage s that are complete, the progress estimate may be computed as the sum over all of the stages of $f_s(Q_s+T_s)$.

Regardless of the manner in which job progress is assessed, method 300 may proceed to act 332. At act 332 an adjustment to the assessed progress may be made. The adjustment may reduce the assessed progress of execution. When a resource allocation is made based on the adjusted progress value, more resources may be allocated to the executing job than if the un-adjusted value were used. Such an adjustment may introduce slack into the resource allocation process such that, if there are inaccuracies in either the predictive model or the assessment of job progress, it is less likely that a scenario will arise in which resource allocation needs to be increased for the job to complete by its target completion time. The inventors have recognized and appreciated that removing allocated resources if a job is on track to complete prior to its target execution time is more efficient, and more likely to be effective, than adding resources to speed up progress.

Regardless of whether slack is introduced at act 332, processing may proceed to act 334. At act 334, the predictive model may be accessed. In this case, the model may be used to determine an estimated time to complete execution of the job based on the current progress and current resource allocation.

At act 340, the estimated time to complete the job may be compared with the target completion time. Method 300 may branch depending on the result of this completion. If the comparison performed at act 300 indicates that the estimated time to completion will result in completion in a time that is within a range of acceptable completion times, method 300 may loop back without adjusting allocated resources. In this example, processing loops back to act 330 where the job progress may be assessed again.

Though not illustrated in FIG. 3, when processing loops back, the assessment at act 330 may occur at any suitable time after a prior assessment of job progress. For example, job progress may be assessed at periodic intervals, such that upon looping back to act 330, processing may wait until the next scheduled interval for assessing progress. Though, it should be appreciated that the frequency with which progress is assessed or the triggers for reassessing progress are not critical to the invention.

Conversely, if the predicted time to complete determined at act 336 is outside the limits based on a target completion time, method 300 may proceed to act 350. At act 350, a new allocation of resources may be determined. The new allocation may be determined in any suitable way. However, in some embodiments, the allocation may be determined based on the predictive model. For this purpose, the available time before the target completion time may be computed. The model may be searched to find a level of resources, given the current job progress, that is predicted to lead to job completion in less than the available time.

In some embodiments, a resource allocation may be selected to make efficient use of resources of the computing cluster. For example, the smallest number of resources predicted to reach job completion by the target completion time may be selected.

Regardless of the manner in which an updated amount of resources is determined, processing may proceed to act 352. At act 352, allocation of resources may be smoothed. Smoothing in this context may entail filtering a stream of values representing un-smoothed allocations over successive iterations of the control loop, which may be achieved by computing a running average of the allocations determined in act 354 over multiple successive iterations through the control loop of method 300. Smoothing in this way may avoid inefficiencies associated with allocating and then de-allocating resources to executing job as a result of small changes in the progress of the job relative to the schedule predicted for the job.

The method of FIG. 3 may continue in this fashion until the job is completed. In this way, the method 300 may implement a resource allocation control loop.

A goal of the resource allocation control loop may be to implement a policy which maximizes the job's utility and minimizes its impact on the cluster by adjusting the job's resource allocation. In some embodiments, there may be four inputs to the control loop: (1) $f_s$, the fraction of completed tasks in stage s; (2) $t_r$, the time the job has spent running; (3) a utility of the job completing at time t; and (4) Either the precomputed C(p, a) distributions, $Q_s$ and $T_s$, for each stage s (when using a simulator-based approach, as described above), or precomputed ls, $L_s$, and $T_s$ for each stage s (when using the Amdahl's Law-based approach, as described above).

An exemplary utility function may be nearly flat until the job deadline, dropped to zero some time after the deadline and, in some scenarios, keep dropping below zero to indicate a penalty for late finishes. In such an embodiment, the output of the policy is the resource allocation for the job.

The basic policy logic may periodically observe the job's progress and adapt the allocated resources to ensure the job finishes with high utility. First, it may compute the progress p using a job progress indicator. Next, the expected utility from allocating computing resources is computed as follows: given progress p and the time the job has been running $t_r$, the expected utility is $U_a=U(t_r+C(p, a))$. Finally, the minimum allocation that maximizes utility is Ar=arg $\min_a\{a:U_a=\max_b U_b\}$.

Inaccuracies in predicting job latencies and the nondeterministic performance of the cluster might cause the raw allocation Ar to under- or over-provision resources, or oscillate with changes. To moderate these scenarios, one or more control theory mechanisms may be used.

One such mechanism is slack. To compensate for inaccuracy in the job latency estimate (by the simulator or Amdahl's Law), the predictions from C(p, a) may be multiplied by a constant factor S. For example, with slack S=1.2, an additional 20% is added to the predictions.

A second such mechanism is hysteresis. To smooth oscillations in the raw allocation, hysteresis parameterized by a may be used. As a specific example, the resource allocation may be smoothed such that the smoothed allocation $A_s(t)$ at any time may be computed as $A_s(t)=A_s(t-1)+\alpha(A'(t)-A_s(t-1))$, where A'(t) represents the un-smoothed allocation. In this example, a value of a equal to 1 implies that the allocation immediately jumps to the desired value. When a takes on a value between 0 and 1, the gap between the allocation and the desired value reduces exponentially with time.

Yet a further control theory mechanism may be a dead zone. To dampen noise in the job progress indicator, a dead zone of length D may be incorporated. A dead zone may be implemented as a shift to the left (i.e. earlier in time) in the utility function by an amount D in combination with a threshold deviation from schedule in order to change on allocation of resources to a job. In this example, the resource allocation may only be changed if, based on assessed progress of the job, the job is at least a time D behind schedule. As a specific example, with D=3 minutes, a deadline of 60 min. is treated as a deadline of 57 min., and the resource allocation policy does not specify increasing allocation of resources unless the job is delayed by at least 3 min.

In some embodiments, values for these parameters representing slack, hysteresis and/or dead zone can be set in advance with the aid of a simulator or in any other suitable way. Slack, for example, may be set based on a simulator's margin of error when compared with actual job executions.

The values representing hysteresis and dead zone, for example, may be determined experimentally with a simulated control loop. While there is no requirement that the simulator perfectly reproduce the actual dynamics of the computing cluster and the jobs being executed, such an approach may nonetheless provide approximate values which may be suitable for adjusting these settings.

Figure 4:
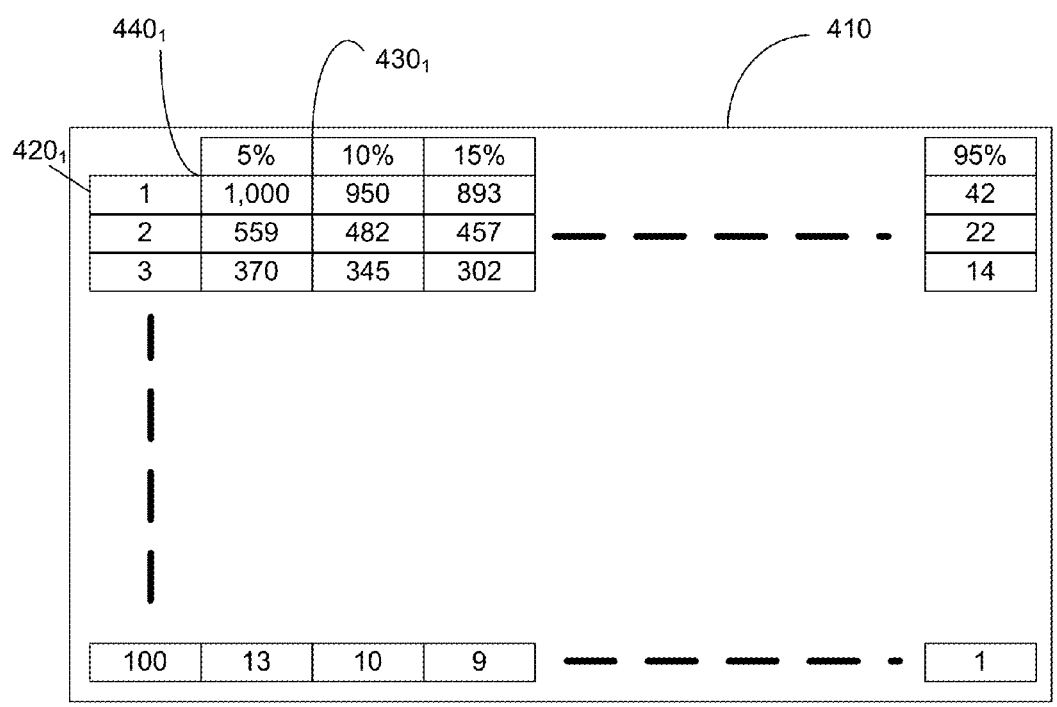
FIG. 4 is a conceptual sketch of an exemplary embodiment of a data structure storing a predictive model.

A predictive model useful in dynamically allocating resources to executing jobs may be in any suitable form. In some embodiments, the predictive model may be generated in an off-line environment and stored as a data structure that may be accessed in a runtime environment by a scheduler implementing a resource allocation control loop. FIG. 4 illustrates an exemplary data structure 410 organizing data to reveal a relationship between, on the one hand, job progress and allocated resources, and on the other hand, time to complete execution of a job. In operation, a data structure of this type may be created for each job using techniques as described herein or any other suitable techniques. Such a data structure may be stored in a computer readable medium, such as database 162 (FIG. 1), from which it may be accessed by a scheduler. Though, it should be appreciated that the specific format for storing a predictive model is not critical to the invention.

In this example, data structure 410 is organized in rows, each representing a specific resource allocation, and columns, each representing a specific amount of progress towards completion of the job. For example, row $420_1$ represents a scenario in which one computing resource is allocated for completion of the job. Column $430_1$ represents a scenario in which the job is 5% complete. Cell $440_1$ at the intersection of row $420_1$ and column $430_1$ in data structure 410 holds a value indicating the predicted time to complete the remaining 95% of the job using one processing resource. Other cells in the data structure 410 indicate time to complete the job at different progress points and for different levels of allocated resources.

A predictive model in the form of data structure 410 may be utilized by determining a time until a target completion time for the job. A column representing the current completion state of the job may be identified. That column may be scanned until a cell containing a completion time less than or equal to the time remaining to the target completion time is identified. The row containing that cell indicates an allocation of resources to achieve the target completion time.

It should be appreciated that FIG. 4 is a simplified representation of a predictive model. Data representing the predictive model may be stored in any suitable way. Depending on the organization of data forming the predictive model, different or additional techniques for determining a resource allocation based on the relationship between time to complete, allocated resources and current progress may be used.

Any suitable technique may be used to determine the target completion time. In some embodiments, the target completion time may be determined based on application of a utility function. The utility function may relate a metric of utility to completion times. The metric of utility may represent economic value to the operator of a computing cluster for completing a job at each of one or more times. Though, other attributes may lead to utility for an operator of a computing cluster. In some embodiments, the operator of the computing cluster may also be the entity submitting jobs to the cluster, such that other metrics of utility may be appropriate. Those metrics, for example, may relate to the importance to the job owner of completing the job at a particular time. In other embodiments, the metric of utility may be based on customer satisfaction, whether or not the operator of the computing cluster receives additional economic benefit when a customer is satisfied with the completion time of a job.

Figure 5A:
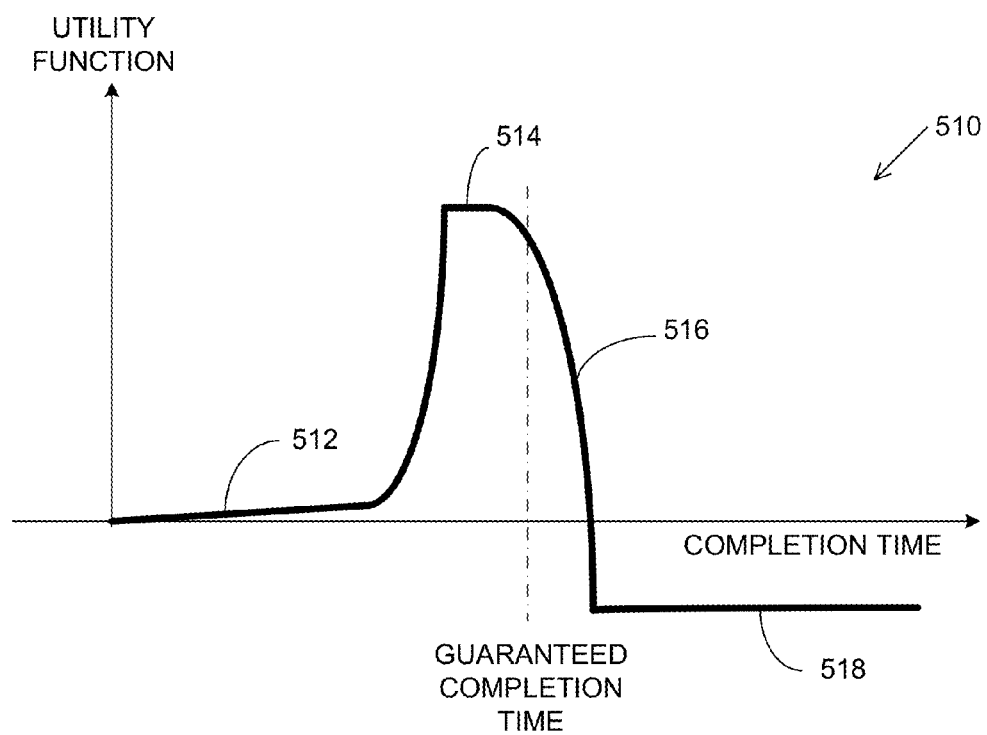
FIG. 5A is a graphical representation of an exemplary utility function that may be used to allocate resources to an executing job using a predictive model.

Moreover, it should be appreciated that a utility function may reflect multiple attributes. For example, a utility function may reflect value to an operator of a computing platform in having resources available to allocate for other jobs. FIG. 5A illustrates an example of such a utility function.

In this example, the utility function 510 represents utility in a scenario in which an operator of a computing platform has entered into a service level agreement with the entity submitting the job for which utility function 510 is applicable. That service level agreement may include a guaranteed completion time, as indicated in FIG. 5A. Accordingly, utility function 510 has a maximum value 514 immediately preceding the guaranteed completion time.

Prior to the maximum value 514, utility function 510 has a portion 512 corresponding to a range of times in which the utility for completing the job is relatively low. Portion 512, in this example, indicates that there is little value to the operator of the computing platform in completing the job early. Such a scenario may arise, for example, if the operator of the computing platform can obtain greater utility by applying computing resources to other jobs in the time corresponding to portion 512.

Utility function 510 includes a portion 516 following the maximum value 514. Portion 516 corresponds to a time following the guaranteed completion time in which the value of completing the job may fall off rapidly. Such a scenario may arise, for example, in a service level agreement in which the operator of the cluster computing platform is not entitled to payment for executing a job if the job completes after the guaranteed completion time.

Utility function 510 includes a further portion 518. Portion 518 represents a negative utility. Such a portion in a utility function may indicate that a service level agreement imposes a penalty for completion after a specific time. In such a scenario, there may be a negative value—and therefore negative utility—to completing a job after a specific time. Portion 518, therefore, may represent completion after such a time.

It should be appreciated that FIG. 5A provides just one example of a possible utility function based on exemplary factors that may contribute to utility. Other factors may lead to utility functions of different shapes. Nonetheless, FIG. 5A provides an example of how a utility function may be used to determine a target completion time for resource scheduling.

In some embodiments, a utility function may be determined for a job. The utility function, for example, may be provided with the job or may be computed for the job based on conditions present at the time the job is submitted. In a system such as is illustrated in FIG. 1, the utility function associated with a job may be stored, such as in database 162. When processing to make a resource adjustment is performed, the utility function may be accessed. In the example of FIG. 2, this may occur at each iteration through the resource allocation control loop, if the utility function may vary dynamically based on factors such as load on the computing platform. Though, if the utility function does not vary dynamically, it may be accessed at job initiation time to determine a target completion time that is used throughout processing of the job.

Regardless of when the utility function is accessed, the target completion time may be determined based on a maximum value for the utility function. In the example of FIG. 5A, the target completion time may be determined from the maximum 514 of utility function 510. A time until that maximum may be used in selecting a level of resources to be allocated for completion of the job.

Figure 5B:
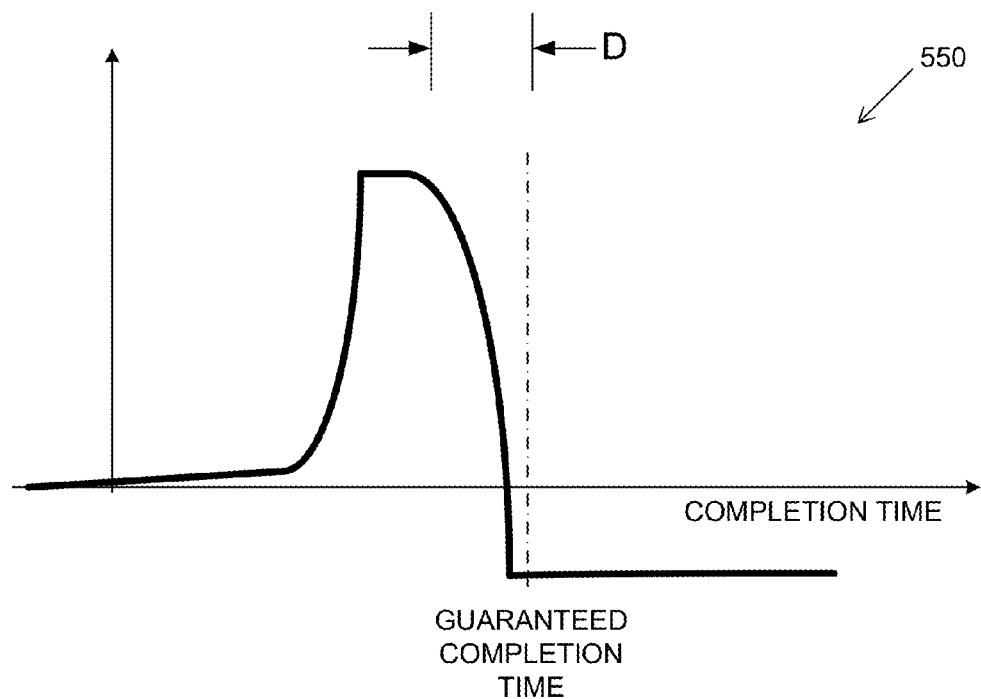
FIG. 5B is a graphical representation of the utility the function of FIG. 5A shifted in time to implement a dead zone.

FIG. 5B illustrates a scenario in which a dead zone is incorporated into a resource allocation control loop. In this example, utility function 550 has the same shape as utility function 510 (FIG. 5A). However, utility function 550 has been shifted earlier in time by an amount D. This amount D represents the dead zone. In this embodiment, the quantity D represents the difference between a predicted completion time and a target completion time that must exist for a scheduler to increase resources allocated to an executing job. In some embodiments, a corresponding threshold may be applied for decreasing resources to and executing job. However, there is no requirement that thresholds be used for both increasing and decreasing or that, if two thresholds are used, that they have the same value.

In both FIGS. 5A and 5B, the utility function is based on parameters of a single executing job. However, it is not a requirement of the invention that the utility function used in scheduling resources for a job or the target completion time for a job be based solely on factors associated with that job. In some embodiments, the utility function applied may be derived from factors that may optimize utility given multiple executing jobs. In such an embodiment, the utility function applied for a single job may be an expected marginal utility derived from the overall utility function. Though, any suitable utility function may be used.

Figure 6:
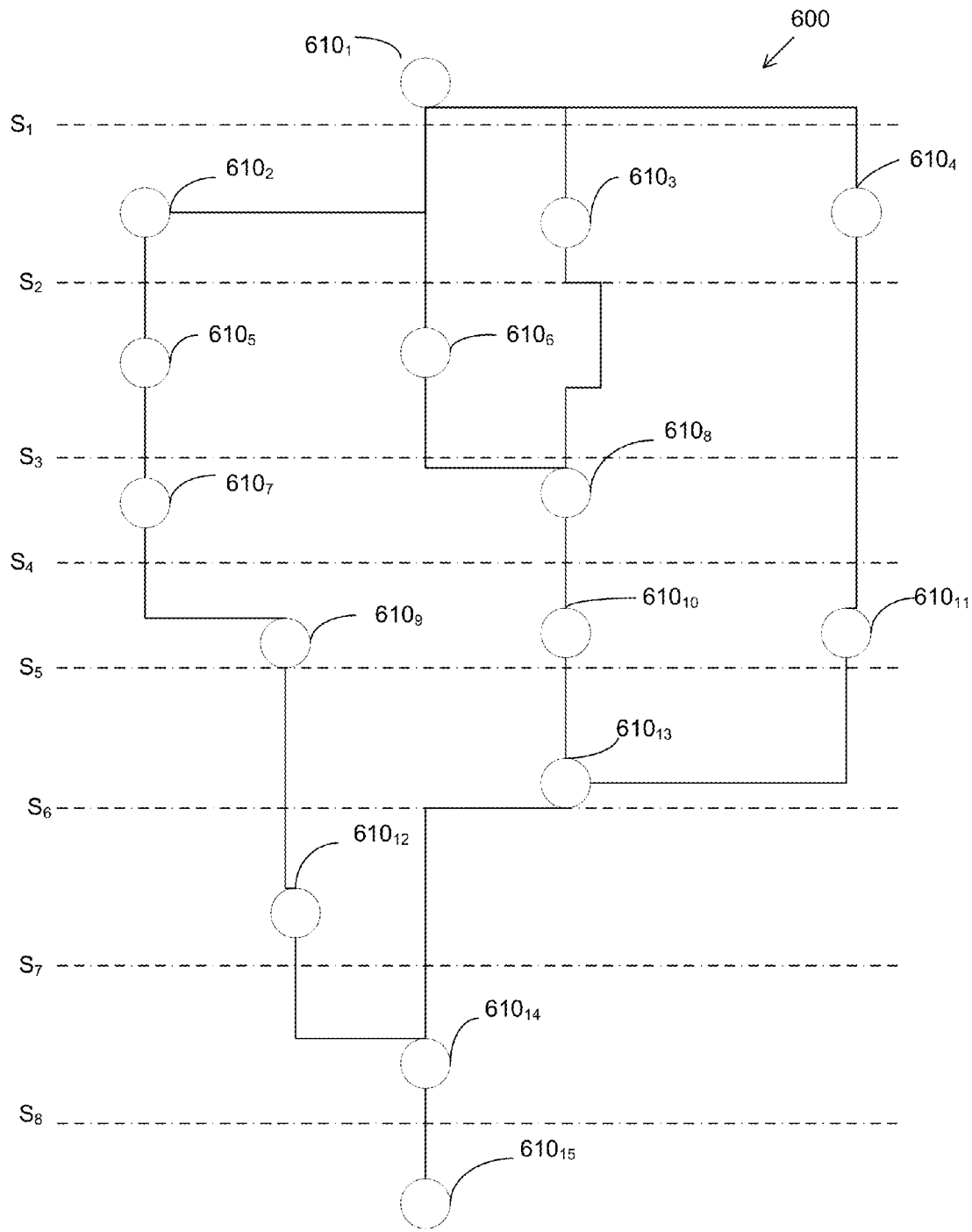
FIG. 6 is a graphical representation of a directed graph, which illustrates dependencies among tasks in a job.

Turning to FIG. 6, a pictorial representation of a job is presented. Such a representation may be useful in understanding scheduling as described herein. This representation illustrates dependencies among tasks making up a job. In this example, tasks $610_1$, $610_2$ ... $610_{15}$ are illustrated. For simplicity, 15 tasks are illustrated. However, it should be recognized that in a conventional data parallel job there may be many more tasks.

In this example, dependencies are shown between the tasks by lines. For example, each of tasks $610_2$, $610_3$ and $610_4$ depends on the output of $610_1$. Similar dependencies are shown for other tasks such that FIG. 6 graphically depicts a directed graph 600. Specifically in this example, directed graph 600 is a directed acyclic graph (DAG). Though, it should be appreciated that there is no requirement that dependencies among tasks be represented graphically. Rather, it should be recognized that FIG. 6 provides a graphical tool for visualizing dependencies that may be considered during the processing used to apply a resource allocation policy based on a predictive model.

FIG. 6 additionally indicates stages in the directed graph. In this example, stages $S_1$, $S_2$, ... $S_8$ are illustrated. As shown, each stage includes a collection of tasks that are at the same level of the hierarchy established by directed graph 600. Partitioning the directed graph 600 into stages may facilitate tracking progress of the job as it executes. However, it is not a requirement of the invention that a job, even if represented as a directed graph, be partitioned into the stages illustrated, as any suitable technique for tracking progress may be applied as part of a resource allocation control loop.

The information about the dependencies among tasks in a job depicted in FIG. 6 may be obtained in any suitable way. In some embodiments, for example, the number and interconnections of the tasks may be derived from a job profile or other static information about a job, including, in some embodiments, an analysis of the code base of the job. Alternatively or additionally, information about the job may be obtained from tracking progress of the job during one or more prior executions. In addition to revealing information about dependencies among tasks, prior execution information may reveal job statistics such as execution time of each task or probability of failure of each task.

Processing to implement such a resource allocation control loop may be performed in any suitable hardware components. FIG. 1, for examples illustrates a scheduler 160. A scheduler, and other computing devices as described herein, may be implemented using known computer construction techniques or any other suitable computer construction techniques.

Figure 7:
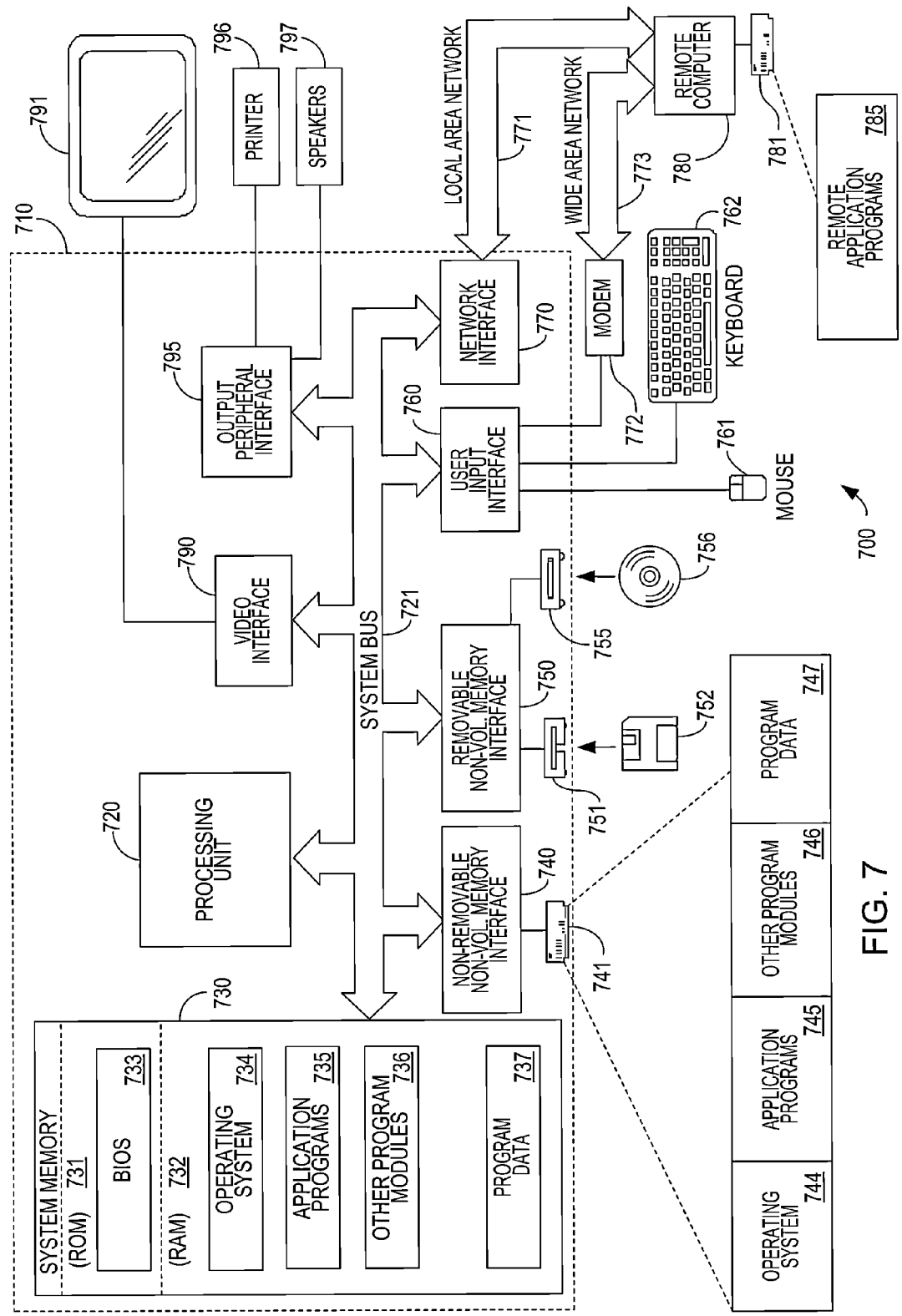
FIG. 7 is a sketch of an exemplary computing environment, in which aspects of the invention may be performed.

FIG. 7 illustrates an example of a suitable computing system environment 700 on which aspects of the invention may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment in FIG. 1.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Though not expressly indicated in FIG. 7, a Graphical Processor Unit (GPU) could alternatively or additionally be scheduled and allocated as resources in a cluster where general purpose computation on graphical processor unit (GPGPU) is used.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through an non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, embodiments are described in which a target completion time is derived from a service level agreement and/or a utility function. However, the target completion time may be derived in any suitable way. It may, for example, be derived from a requested completion time submitted by a user with a job or from a deadline associated with the job.

As another example of an alternative, embodiments are described above in which a predictive model is used to determine the amount of resources to allocate when executing a job. In other embodiments, the predictive model may alternatively or additionally be used to determine whether a job should begin execution. As a specific example, the simulator and/or predictive model may be used for admission control in the cluster. In other words, given the current state of the cluster (i.e. set of currently running jobs and their progress) and a new job that was just submitted by a user (along with a deadline), the model may be used to check whether the new job "fits" into the cluster (whether the job can be started with an expectation that it will finish on time). Any suitable action may be taken if the job does not fit. For example, execution of the job may not be started and feedback may be provided to the user. The user may employ this feedback in any suitable way, such as to adjust the deadline submitted with the job.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method implemented by one or more processing units, the method comprising:
   analyzing a structure of a job to determine:
      dependencies among tasks of the job, the dependencies including one task using output from another task, and a critical path of the job;
   building a model of execution time of the job by a computing cluster, the model based on the dependencies among the tasks and a length of the critical path, the model relating aggregate time spent to complete the tasks of the job to resources allocated to the job; and
   at a plurality of times:
      assessing processing remaining on the job,
      updating the model based on the processing remaining, the updating including considering the dependencies, the critical path, and execution failures of individual tasks of the job, and
      adjusting the resources allocated to the job based on the updated model and a utility function.

2. The method of claim 1, wherein:
   the utility function defines utility for completing the job as a function of the execution time to complete the job.

3. The method of claim 2, wherein:
   the job is submitted by a customer of an operator of the computing cluster;
   the customer has a service level agreement with the operator defining the execution time to complete the job; and
   the utility function is based on the service level agreement.

4. The method of claim 1, the method further comprising:
   at another time:
      assessing the processing remaining on the job, and
      not updating the model based on the processing remaining after considering the dependencies, the critical path, and any execution failures of the individual tasks of the job.

5. The method of claim 1, wherein:
   the adjusting the resources allocated to the job comprises selecting an amount of resources to allocate to the job based on a computation to increase utility described by the utility function.

6. The method of claim 1, wherein:
   the building the model occurs prior to the plurality of times by simulating the execution of the job for a plurality of levels of the resources allocated to the job.

7. The method of claim 1, wherein the analyzing the structure comprises:
   analyzing a code base of the job.

8. The method of claim 1, wherein:
   the analyzing the structure of the job comprises tracking progress of the job during one or more prior executions of the job; and
   at least two of the tasks are executed in parallel according to the structure.

9. At least one computer-readable memory device or storage device storing computer-executable instructions that, when executed by one or more processing devices, cause the one or more processing devices to perform acts comprising:
   building a model of execution of a job by a computing cluster, the building comprising:
      analyzing a structure of the job to determine dependencies among tasks of the job, a completion time of the job, and a length of a critical path of the job,
      simulating task failures in execution of the job, and
      relating aggregate time spent to complete the tasks of the job to an allocation of resources of the computing cluster for the execution of the job;
   updating the model based on progress in an actual execution of the job, the updating including considering the dependencies, the critical path, and actual execution failures of the tasks of the job; and
   dynamically allocating the resources of the computing cluster to the job based on the updated model.

10. The at least one computer-readable memory device or storage device of claim 9, wherein:
    the dynamically allocating the resources comprises adjusting the resources based on one or more of:
       a utility function relating the completion time of the job to a metric of utility;
       a deadline associated with the job; or
       a requested completion time for the job.

11. The at least one computer-readable memory device or storage device of claim 9, wherein:
    the dynamically allocating the resources comprises adjusting the resources based on a utility function that considers a required completion time associated with the job.

12. The at least one computer-readable memory device or storage device of claim 9, wherein:
    the simulating the task failures comprises adjusting the completion time based on time required to re-perform a failed individual task.

13. The at least one computer-readable memory device or storage device of claim 9, the acts further comprising estimating progress of the job, the estimating comprising computing, for each of a plurality of stages in the job, a quantity indicating time spent completing individual tasks that are associated with the stages executing and enqueued on the computing cluster.

14. The at least one computer-readable memory device or storage device of claim 9, wherein:
    the completion time of the job is associated with the length of the critical path of the job.

15. The at least one computer-readable memory device or storage device of claim 9, wherein:
    the analyzing the structure of the job to determine the dependencies among the tasks of the job includes determining that at least one individual task depends from two other individual tasks.

16. A system comprising:
    a plurality of processing units; and
    a scheduler configured to execute on the plurality of processing units and cause the plurality of processing units to:
       receive a job for execution, the job comprising tasks,
       construct a model of the execution of the job based on a directed graph representing dependencies among the tasks of the job and a length of a critical path of the job, the model relating aggregate time spent to complete the tasks to computing resources allocated to the job;
       updating the model based on assessed progress of the execution of the job, the updating considering processing time associated with failures during the execution of some of the tasks, and dynamically allocate the computing resources based on the updated model.

17. The system of claim 16, wherein:
the system further comprises a database associating service level data with the job; and
the computing resources are dynamically allocated based on a determination, made using the model, of an amount of the computing resources to achieve a completion time indicated by the service level data.

18. The system of claim 16, wherein nodes of the directed graph represent individual tasks of the job.

19. The system of claim 18, wherein edges of the directed graph represent the dependencies among the tasks of the job.

20. The system of claim 16, wherein:
the scheduler is further configured to determine the assessed progress of the execution of the job by computing, for stages in the job, a quantity indicating time spent for the stages.

* * * * *